W. LEVY.
DECOY.
APPLICATION FILED NOV. 26, 1918.
1,298,361. Patented Mar. 25, 1919.
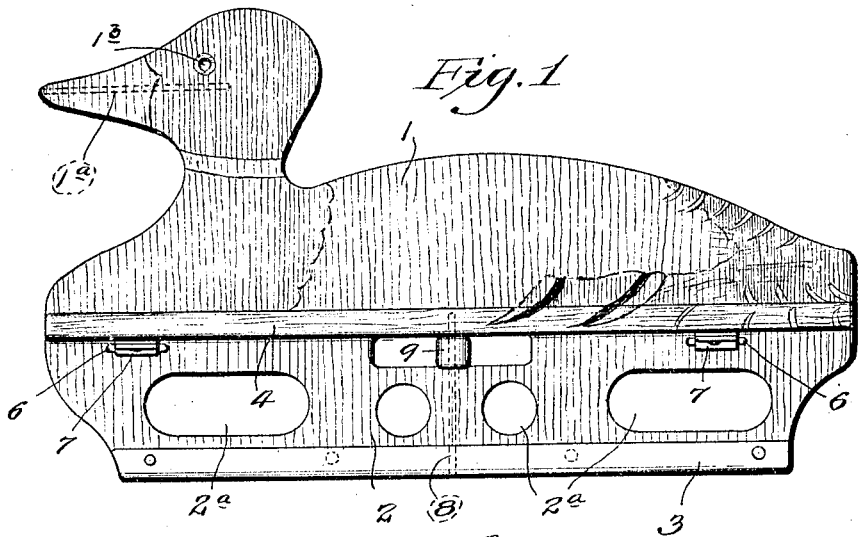
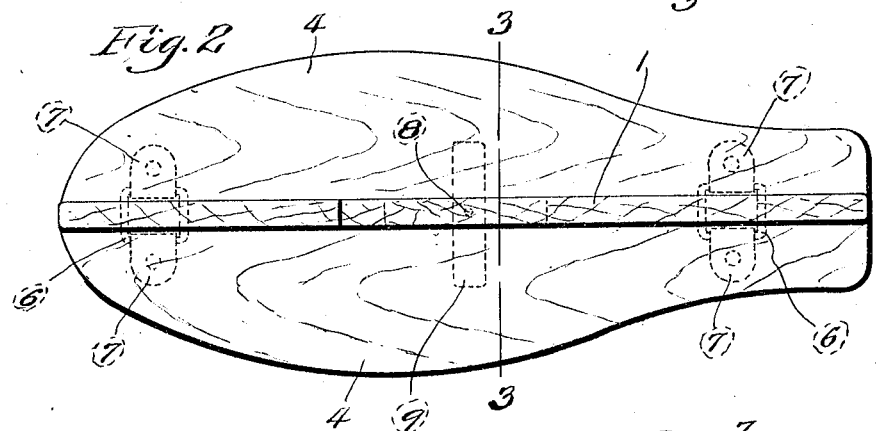
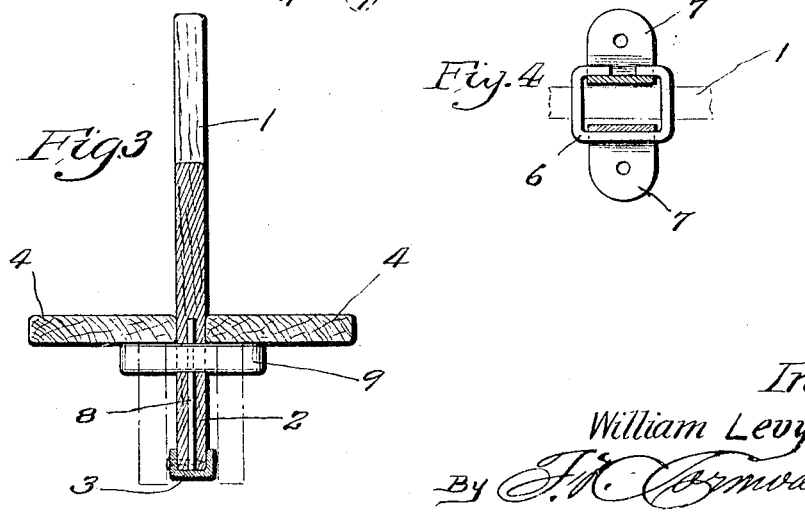
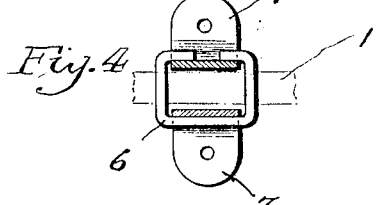
Inventor
William Levy

UNITED STATES PATENT OFFICE.

WILLIAM LEVY, OF ST. LOUIS, MISSOURI.

DECOY.

1,298,361. Specification of Letters Patent. Patented Mar. 25, 1919.

Application filed November 26, 1918. Serial No. 264,166.

*To all whom it may concern:*

Be it known that I, WILLIAM LEVY, a citizen of the United States, residing at the city of St. Louis, State of Missouri, have invented a certain new and useful Improvement in Decoys, of which the following is a full, clear, and exact description, such as will enable others skilled in the art to which it appertains to make and use the same, reference being had to the accompanying drawings, forming part of this specification.

This invention relates to a new and useful improvement in decoys, of the folding or collapsible variety, the objects being to produce a decoy which will be simple in construction, cheap to manufacture, and effective in appearance.

With the foregoing and other objects in view, my invention consists in certain novel features of construction and arrangement of parts, hereinafter more fully described and claimed, and illustrated in the accompanying drawings, in which—

Figure 1 is a side elevational view of my improved decoy.

Fig. 2 is a top plan view.

Fig. 3 is a cross-sectional view on line 3—3 of Fig. 2.

Fig. 4 is a detail view of one of the hinges.

In the drawings, 1 indicates the body of the decoy, shaped in profile to represent a duck in this instance, although other birds, such as plover and geese, may be similarly imitated, this body portion preferably being composed of a single ply thin slab of wood or composition material. When made of wood, for economy, the grain runs vertically, or substantially so, and as the bill of the imitation bird is liable to damage in transportation, I preferably drive a brad or strengthening member 1ª therethrough, as shown in Fig. 1. The eyes 1ᵇ are formed by an opening, preferably chamfered to give them expression. The body portion 1 preferably extends downwardly to form a keel portion 2, which is provided with one or more openings 2ª and has a U-shaped strip of metal 3 secured to its lower edge.

4 are the wings or floats hinged to the body portion by means of practically closed or re-bent staples 6, shown in Fig. 4, which staples are driven or passed through openings previously formed in the body portion, so as to provide pintles for the refolded hinge leaves 7 secured to the wing or float portions 4. These hinge leaves 7 are preferably narrower than the length of the pintles so as to accommodate swelling or warping of the body portion and keel.

The wing or float portions just referred to, when made of wood, are of a single ply or thickness having the grain disposed at an angle to the body and keel portions, and as the wings are adapted to be folded downwardly over the keel portion, they not only serve as a protection for the keel (weakened by the openings 2ª) but, by virtue of the longitudinally disposed grain of the wood in the wings, they reinforce and strengthen the body and kneel portions in their open and folded positions. The strip 3 also serves as a strengthening member for the keel.

The numeral 8 indicates a brad or pivot member vertically disposed in the keel portion and passing through a button or supporting member 9, whose width is about the same or slightly less than the thickness of the keel portion, this button being arranged to operate in an opening in the keel portion so that when it is folded so as to lie parallel to the keel portion, it will permit the wings to be folded down, as shown by dotted lines in Fig. 3, but when the wings are raised, as shown by full lines in said figure, it may be turned at an angle to support them.

A weighted or staked cord may be attached to any of the openings in the keel portion, but preferably to the forward one, as by so doing, the decoy will face the wind and appear in a more natural position when placed in water.

The body and keel portions, as well as the wings, after being shaped, are preferably dipped in priming paint, after which they are stenciled, printed, or hand-painted, in imitation of the bird they are to represent. After this they are preferably dipped in varnish, and assembled.—although the assembling may be done before the painting.

It is estimated that six of these profile decoys will weigh about as much as one solid wooden "block" as the solid wooden decoys are termed, and as they can be folded, and take up but very little space in transportation, a comparatively large number can be carried at slight inconvenience.

When tossed in the water, my improved decoy, by virtue of the openings in the keel and the weight of the strip 3, will quickly right itself and thereafter maintain an upright position.

What I claim is:

1. A decoy composed of a single ply wooden body and keel portions, and single ply wooden wing portions, the grain of the latter extending at an angle to that of the former.

2. A decoy composed of a single ply wooden body and keel portions, and single ply wooden wing portions, the grain of the latter extending at an angle to that of the former, said parts having hinged relation to each other so that they may be folded when not in use.

3. A decoy composed of a single ply wooden body and keel portions, and single ply wooden wing portions, the grain of the latter extending at an angle to that of the former, said parts having hinged relation to each other so that they may be folded when not in use, and having means for sustaining the parts in their operative position.

4. A decoy comprising a wooden body portion having the grain vertically disposed, and a metallic member passing through the imitation bill.

5. A decoy comprising a body and keel portions, the latter having one or more openings, a weight at the lower edge of the keel portion, and wings or floats hinged to the body portion.

6. A decoy composed of a single ply wooden body portion, single ply wooden wing portions, the grain of the latter extending at an angle to that of the former.

7. A decoy comprising a wooden body and keel portions, re-bent staples arranged therein, wing portions, and refolded leaves secured to the wing portions and embracing parts of said staples.

In testimony whereof I hereunto affix my signature this 22nd day of November, 1918.

WILLIAM LEVY.

Copies of this patent may be obtained for five cents each, by addressing the "Commissioner of Patents, Washington, D. C."